(12) United States Patent
Liu et al.

(10) Patent No.: US 11,398,104 B2
(45) Date of Patent: Jul. 26, 2022

(54) OPTICAL FINGERPRINT SENSOR MODULE AND METHOD FOR OPERATING OPTICAL FINGERPRINT SENSOR MODULE

(71) Applicant: Fingerprint Cards AB, Gothenburg (SE)

(72) Inventors: Jun Liu, Shanghai (CN); Ehsan Hashemi, Gothenburg (SE); Hans Martinsson, Gothenburg (SE); René Nilsson, Eslöv (SE); Farzan Ghavanini, Gothenburg (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/272,577

(22) PCT Filed: Sep. 5, 2018

(86) PCT No.: PCT/CN2018/104161
§ 371 (c)(1),
(2) Date: Mar. 1, 2021

(87) PCT Pub. No.: WO2020/047770
PCT Pub. Date: Mar. 12, 2020

(65) Prior Publication Data
US 2021/0312157 A1    Oct. 7, 2021

(51) Int. Cl.
*G06V 40/13* (2022.01)
*H03K 17/96* (2006.01)
*G06F 21/32* (2013.01)

(52) U.S. Cl.
CPC ......... *G06V 40/13* (2022.01); *H03K 17/9625* (2013.01); *G06F 21/32* (2013.01)

(58) Field of Classification Search
None
See application file for complete search history.

(56) References Cited

U.S. PATENT DOCUMENTS

| 2004/0227736 A1 | 11/2004 | Kamrath et al. |
| 2004/0228508 A1 | 11/2004 | Shigeta |

(Continued)

FOREIGN PATENT DOCUMENTS

| CN | 108463700 A | 8/2018 |
| WO | 0060530 A1 | 10/2000 |

(Continued)

OTHER PUBLICATIONS

PCT International Search Report and Written Opinion dated Jun. 5, 2019 for International Application No. PCT/CN2018/104161, 8 pages.

(Continued)

*Primary Examiner* — Joseph R Haley
(74) *Attorney, Agent, or Firm* — RMCK Law Group, PLC (57) ABSTRACT

There is an optical biometric imaging device configured to capture an image of an object in contact with an outer surface of the biometric imaging device, the biometric imaging device comprising: an image sensor comprising a photodetector pixel array and image sensor circuitry configured to capture an image of the object in contact with the outer surface of the imaging device; the image sensor comprising a first electrically conductive structure arranged adjacent to an active sensing area of the photodetector pixel array; a display panel arranged on top of and at a distance from the image sensor, the display panel comprising a second electrically conductive structure on a bottom side of the display panel and arranged to face the first electrically conductive structure of the image sensor; and capacitive readout circuitry arranged and configured to detect a capacitance between the first electrically conductive structure and the second electrically conductive structure.

14 Claims, 9 Drawing Sheets

(56) References Cited

U.S. PATENT DOCUMENTS

| | | |
|---|---|---|
| 2010/0142770 A1 | 6/2010 | Hayasaka et al. |
| 2012/0250949 A1 | 10/2012 | Abiko |
| 2015/0331508 A1 | 11/2015 | Nho et al. |
| 2016/0132712 A1 | 5/2016 | Yang et al. |
| 2017/0103246 A1 | 4/2017 | Pi et al. |
| 2017/0220840 A1 | 8/2017 | Wickboldt et al. |
| 2017/0300736 A1 | 10/2017 | Song et al. |
| 2017/0372110 A1 | 12/2017 | Uehara et al. |
| 2018/0035923 A1 | 2/2018 | Kang et al. |
| 2018/0129798 A1 | 5/2018 | He et al. |
| 2018/0211078 A1 | 7/2018 | Lillie et al. |
| 2018/0293420 A1* | 10/2018 | Kim ................ G06F 1/1626 |
| 2018/0365466 A1* | 12/2018 | Shim ................ G06K 9/0004 |
| 2020/0264751 A1* | 8/2020 | Ha ................ G06F 21/83 |

FOREIGN PATENT DOCUMENTS

| | | |
|---|---|---|
| WO | 2004057523 A1 | 7/2004 |
| WO | 2012054359 A1 | 4/2012 |
| WO | 2018014629 A1 | 1/2018 |

OTHER PUBLICATIONS

Extended European Search Report dated Aug. 19, 2021 for EP Application No. 18932346.2, 7 pages.

Zhang, J. et al., "Short Distance Fingerprint Capturing System by Lateral Waveguide Backlighting," 2017 2nd International Seminar on Applied Physics, Optoelectronics, and Photonics (APOP 2017), https://dpi-proceedings.com/ndex.php/dtetr/article/download/18729/18225, pp. 180-186.

\* cited by examiner

OPTICAL FINGERPRINT SENSOR MODULE AND METHOD FOR OPERATING OPTICAL FINGERPRINT SENSOR MODULE

CROSS-REFERENCE TO RELATED APPLICATIONS

This application is a 371 U.S. National Stage of International Application No. PCT/CN2018/104161, filed Sep. 5, 2018. The disclosure of the above application is incorporated herein by reference in its entirety.

FIELD OF THE INVENTION

The present invention relates to an optical fingerprint sensor and to a method for operating an optical fingerprint sensor. In particular, the invention relates to the integration of an optical fingerprint sensor with a display panel.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

There is also a desire to integrate fingerprint sensors in the display panel of a user device such as a smartphone in order to achieve "in-display" fingerprint sensing over a larger part of the display area. Optical fingerprint sensors in particular have shown promise for display integration where an optical fingerprint sensor can be attached to the bottom side of an at least partially transparent display panel.

However, the integration of an optical fingerprint sensor with a display panel requires accurate lamination of the sensor to the backside of the display which may be difficult to integrate in existing manufacturing processes.

Accordingly, there is a need for an improved optical fingerprint sensor module suitable for integration with a display panel.

SUMMARY

In view of above-mentioned and other drawbacks of the prior art, it is an object of the present invention to provide an improved optical biometric imaging device integrated with a display panel. The described biometric imaging device is primarily intended for fingerprint recognition, but may also be used to capture other biometric features such as a palmprint and the like.

According to a first aspect of the invention, there is provided an optical biometric imaging device configured to capture an image of an object in contact with an outer surface of the biometric imaging device. The biometric imaging device comprises: an image sensor comprising a photodetector pixel array and image sensor circuitry configured to capture an image of an object in contact with an outer surface of the imaging device; the image sensor comprising a first electrically conductive structure arranged adjacent to an active sensing area of the photodetector pixel array; a display panel arranged on top of and at a distance from the image sensor, the display panel comprising a second electrically conductive structure on a bottom side of the display arranged to face the first electrically conductive structure of the image sensor; and capacitive readout circuitry arranged and configured to detect a capacitance between the first electrically conductive structure and the second electrically conductive structure.

In the present context, the outer surface of the biometric imaging device can be assumed to be the surface of a display panel under which the image sensor is arranged. The image sensor is configured to capture an image of an object such as a finger in contact with the outer surface with sufficient resolution for capturing a fingerprint to be used for identification authentication etc.

That the display panel is arranged on top of and at a distance from the image sensor means that there is no direct contact between the display panel and the image sensor, and furthermore that the distance is selected so that the display panel is allowed to flex a certain amount without making contact with any part of the image sensor. The display panel may for example flex as a result of a user pressing down on the display panel during normal use of a device such as a smartphone in which the display panel may be integrated. In particular, the first electrically conductive structure is separated from the second electrically conductive structure such that the two structures form the plates of a parallel plate capacitor arranged with an insulator therebetween. The insulator is here provided by the air gap between the first and second electrically insulating structures, allowing the distance between the structures to change with the flex of the display panel.

The capacitive readout circuitry is coupled to the first and second electrically conductive structures in order to determine a capacitance therebetween. The capacitive readout circuitry may for example be integrated with the image sensor circuitry. However, it is also possible to provide the capacitive readout circuitry as separate circuitry arranged in the vicinity of the image sensor.

The present invention is based on the realization that it is advantageous to arrange an image sensor of a biometric imaging device separate from the display panel to simplify the manufacturing of the device in which the biometric imaging device is arranged. However, when the image sensor is physically separated from the bottom surface of the display panel, the distance between a finger in contact with the outer surface of the display panel and the image sensor may change depending on the amount of force applied to the surface. Accordingly, by forming a capacitor between the bottom surface of the display panel and the image sensor, the distance between the finger and the image sensor can be accurately determined, which in turn allows the image sensor to be adjusted to the distance for a specific image acquisition.

A further advantage of determining the capacitance as described is that an accidental light touch on the surface can be distinguished from an intentional contact. This may for example be advantageous if the biometric imaging device is in a sleep mode and where a surface touch is used to wake up the device, where it can be ensured that the biometric imaging device and/or the display panel only wakes up if the outer surface is contacted with sufficient force.

According to one embodiment of the invention, the optical biometric imaging device may further comprise a frame, wherein a cover glass of the display panel is arranged to rest on the frame and the image sensor is arranged within the frame. The frame may for example be a rectangular frame encircling an inner volume where the image sensor is located. However, the frame may also consist of several individual sections. The cover glass will thus have larger surface area than the active parts of the display panel such that the display panel exhibits a T-shaped cross-section such that the cover glass can be arranged in mechanical contact with the frame.

According to one embodiment of the invention, the optical biometric imaging device may further comprise a carrier, wherein the photodetector pixel array is arranged on the carrier and the first electrically conductive structure is arranged on the carrier adjacent to the photodetector pixel array. Thereby, there is a freedom to determine where the electrically conductive structures are located which does not directly depend on the configuration of the photodetector pixel array.

According to one embodiment of the invention, the optical biometric imaging device may further comprise a spacer arranged on the carrier adjacent to the first electrically conductive structure. The spacer can be used to prevent the bottom surface of the display panel from making contact with the image sensor in case of excessive force on the display panel. The spacer may also be configured to prevent the first electrically conductive structure from making contact with the second electrically conductive structure, which could potentially cause damage to the electrically conductive structures and to the capacitance readout circuitry.

According to one embodiment of the invention, the optical biometric imaging device may further comprise a spacer arranged between the carrier and the first electrically conductive structure. Thereby, the distance between the first electrically conductive structure and the second electrically conductive structure can be easily controlled by controlling the height of the spacer.

According to one embodiment of the invention, the optical biometric imaging device may comprise a plurality of said first electrically conductive structures. It is thereby possible to determine the distance between the image sensor and the display panel at a plurality of locations.

According to one embodiment of the invention, the display panel may comprise a plurality of said second electrically conductive structures. There may for example be one electrically conductive structure on the display panel for each corresponding electrically conductive structure on the image sensor. However, it is also possible to have one large structure on one a surface and a plurality of smaller structures on the opposing surface. Thereby, it is possible to determine the deformation of the display panel in more detail since the distance between the display panel and the image sensor can be determined at a plurality of locations. The deformation of the display panel can be assumed to depend on the location or locations where force is applied and also on the magnitude of the applied force. Thereby, it may for example be possible to determine if one or more objects are in contact with the surface and the size of an object in contact with the surface may also be estimated.

According to one embodiment of the invention, the frame may comprise a floor portion, thereby forming a U-shaped bracket. The frame can thereby be seen as a box having five sides and where the display panel is arranged as a lid on the top side of the box. Thereby, the optical biometric imaging device including the image sensor and display panel can be formed as a single module ready for integration in a consumer device. Moreover, a seal can be arranged between the frame and the display panel, e.g. between the frame and a cover glass of the display panel in order to protect both the image sensor and active layers of the display panel.

According to one embodiment of the invention, the image sensor is arranged on the floor portion of the bracket, which simplifies the configuration since the image sensor can be attached to the floor of the frame by means of an adhesive.

According to one embodiment of the invention, the floor portion may comprise a recess and the image sensor may be arranged in the recess of the floor portion. Thereby, it may be easier to correctly align the image sensor in relation to the frame.

According to one embodiment of the invention, the floor portion may comprise a through-opening and, the image sensor is arranged in the through-opening of the floor portion. Thereby, it is possible to minimize the overall height of the biometric imaging device including a frame.

According to one embodiment of the invention, the floor portion may comprise a through-opening and the image sensor may be arranged below the through-opening of the floor portion. Thereby, the biometric imaging device can be used also in applications where the space between the display and the floor of the frame is not sufficiently large for accommodating the image sensor.

According to a second aspect of the invention, there is provided a method for detecting a force on a surface of an optical biometric imaging device configured to capture an image of an object in contact with an outer surface of the biometric imaging device, the biometric imaging device comprising: an image sensor comprising a photodetector pixel array and image sensor circuitry configured to capture an image of an object in contact with an outer surface of the imaging device; the image sensor comprising a first electrically conductive structure arranged on a top surface of the image sensor and adjacent to an active sensing area of the photodetector pixel array; a display panel arranged on top of and at a distance from the image sensor; the display panel comprising a second electrically conductive structure on a bottom side of the display arranged to face the first electrically conductive structure of the image sensor; and capacitive readout circuitry arranged and configured to detect a capacitance between the first electrically conductive structure and the second electrically conductive structure; the method comprising detecting a change in capacitance between the first and second electrically conductive structures.

According to one embodiment of the invention the method may further comprise determining a force on the outer surface of the imaging device based on a known relation between the capacitance and the distance between the first and second electrically conductive structures.

According to one embodiment of the invention the method may further comprise determining a demagnification factor of the biometric imaging device based on a known relation between the capacitance and the distance between the first and second electrically conductive structures.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the optical biometric imaging device and method for using such a device according to the present invention are mainly described with reference to an optical fingerprint sensing device integrated in a display panel of a handheld device such as a smartphone. It should however be noted that the described imaging device equally well may be provided as a stand-alone device to be integrated in different applications where biometric imaging is desirable.

Figure 1:
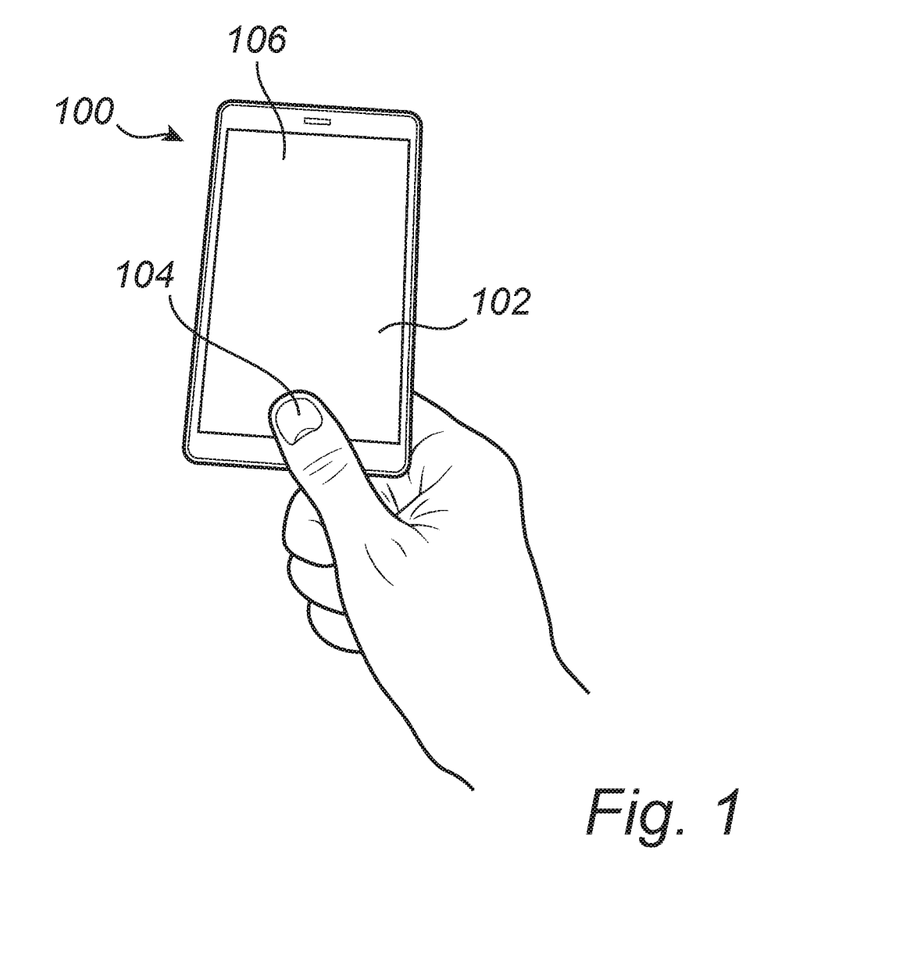
FIG. 1 schematically illustrates a handheld device comprising a biometric imaging device according to an embodiment of the invention.
Figure 2:
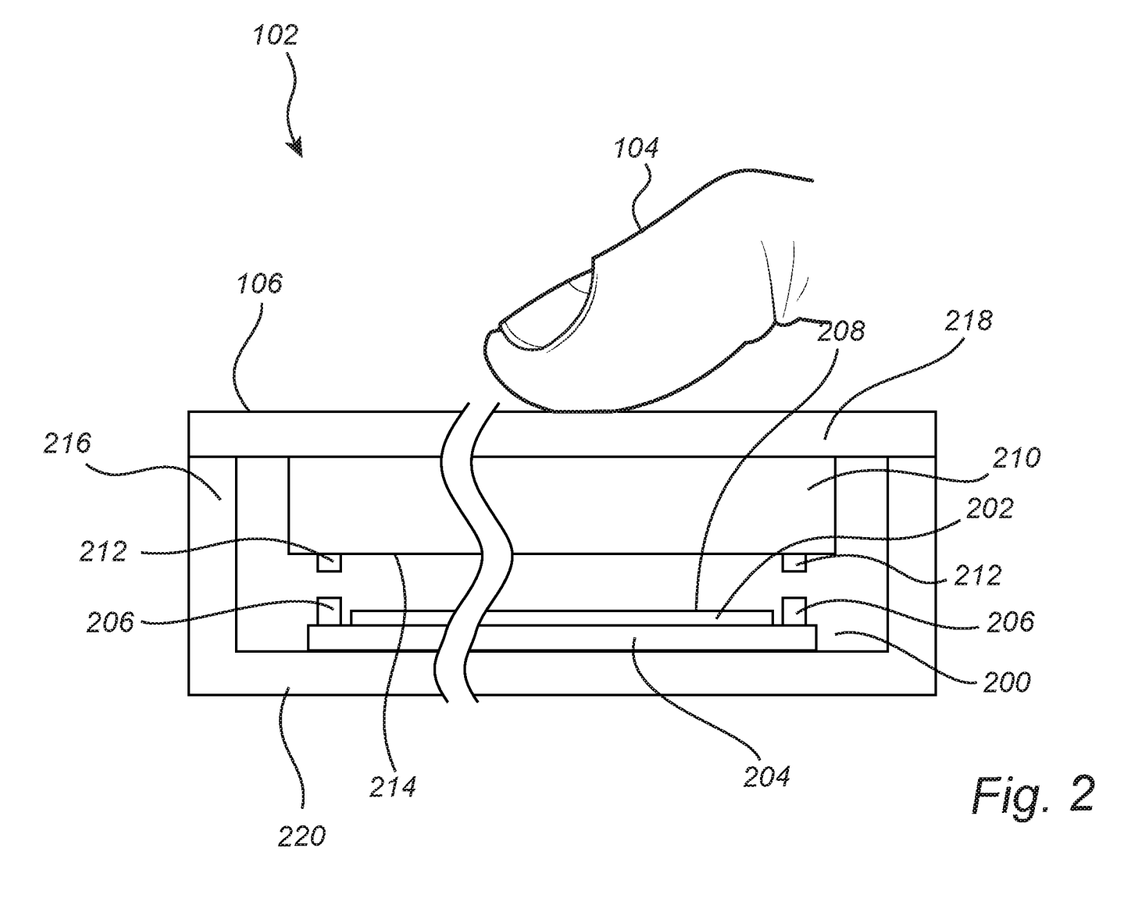
FIG. 2 schematically illustrates a biometric imaging device according to an embodiment of the invention.

FIG. 1 schematically illustrates a smartphone 100 comprising an optical biometric imaging device 102 integrated in the display panel of the smartphone 100. The optical biometric imaging device 102 is configured to capture an image of an object 103 in contact with an outer surface 106 of the biometric imaging device 102. The object 104 in contact with the outer surface 106 is here illustrated as a finger 104 in contact with the surface 106 of the display panel. In addition to fingerprints, the described device 102 may also be used to capture palmprints FIG. 2 schematically illustrates a biometric imaging device comprising an image sensor 200 which in turn comprises a photodetector pixel array 202 and image sensor circuitry (not shown) configured to capture an image of the object 104 in contact with the outer surface 106 of the imaging device 102. The image sensor circuitry may be circuitry integrated in the image sensor 200, external circuitry, or a combination thereof. External circuitry for controlling the image sensor 200 may for example include a microprocessor, microcontroller, programmable digital signal processor or another programmable device.

The image sensor 200 further comprises a first electrically conductive structure 206 arranged adjacent to an active sensing area 208 of the photodetector pixel array 202. In the present description, the photodetector pixel array 202 is arranged on a carrier 204 and the electrically conductive structure 206 is arranged on the carrier 204 adjacent to the photodetector pixel array 202. It is in principle also possible to place the electrically conductive structure 206 on the photodetector pixel array 202, with the caveat that the electrically conductive structure 206 would block light from reaching the pixels directly below the structure 206.

The optical biometric imaging device 102 further comprises a display panel 210 arranged on top of and at a distance from the image sensor 200, the display panel comprises a second electrically conductive structure 212 on a bottom side 214 of the display panel. The bottom side 214 is defined as the side of the display panel 210 facing the image sensor 200. The second electrically conductive structure 212 is arranged to face the first electrically conductive structure of the image sensor 206 such that a capacitive coupling between the first and second electrically conductive structures 206, 212 can be detected.

In the present description, the light illuminating the finger 104 originates from the display panel 210 arranged above the image sensor 200. Light emitted by light emitting elements of the display panel 210 is reflected by the finger 104 and redirected towards the image sensor 200 in order for the image sensor 200 to capture an image of the finger 104 with sufficient resolution for resolving the fingerprint of the finger 104.

As illustrated in In FIG. 2, the optical biometric imaging device may further comprise a frame 216, wherein a cover glass 218 of the display panel 210 is arranged to rest on the frame 216 and wherein the image sensor 200 is arranged within the frame 216. The main function of the frame 216 is to carry the display panel 210, and many different configurations of the frame are possible. The frame 216 may for example be continuous, semi continuous or consist of individual support structures. It should be noted that the correct distance between the image sensor 200 and the display panel 210 may be achieved in many different ways, also without a frame 216, for example by suitably attaching the display panel 210 and the image sensor 200 to the device 100 in which the biometric imaging device 102 is arranged. It should further be noted that the figures are not drawn to scale, and that the purpose of the figures is to convey principal features of various embodiments of the invention.

The frame 216 illustrated in FIG. 2 further comprises a floor portion 220. Thereby, a cross section of the frame 216 forms a U-shaped bracket. The illustrated frame 216 can thus be seen as a box without a lid, where the image sensor 200 is arranged on the floor 220 of the frame 216.

The optical biometric imaging device 102 further comprises capacitive readout circuitry (not shown) arranged and configured to detect a capacitance between the first electrically conductive structure 206 and the second electrically conductive structure 212. The detected capacitance is proportional to the distance between the first and second electrically conductive structures 206, 212, and a vertical movement of the bottom surface 214 of the display panel 210 can thus be detected by monitoring the capacitance. The capacitive readout circuitry may be circuitry integrated in the image sensor 200, external circuitry, or a combination thereof. External circuitry for controlling the capacitive readout may for example include a microprocessor, microcontroller, programmable digital signal processor or another programmable device.

The first and second electrically conductive structures 206, 212 face each other to form a parallel plate capacitor with an air gap as the dielectric layer. The first and second electrically conductive structures 206, 212 may for example be formed by depositing a respective metal layer. Moreover, it is not required that the two electrically conductive structures 206, 212 are of the same size. It is also possible to provide a plurality of electrically conductive structures 206, 212 on the display panel 210 and on the image sensor respectively, to form a plurality of capacitors, in order to detect a vertical movement of the display panel 210 in relation to the image sensor 200 at multiple locations.

Figure 3:
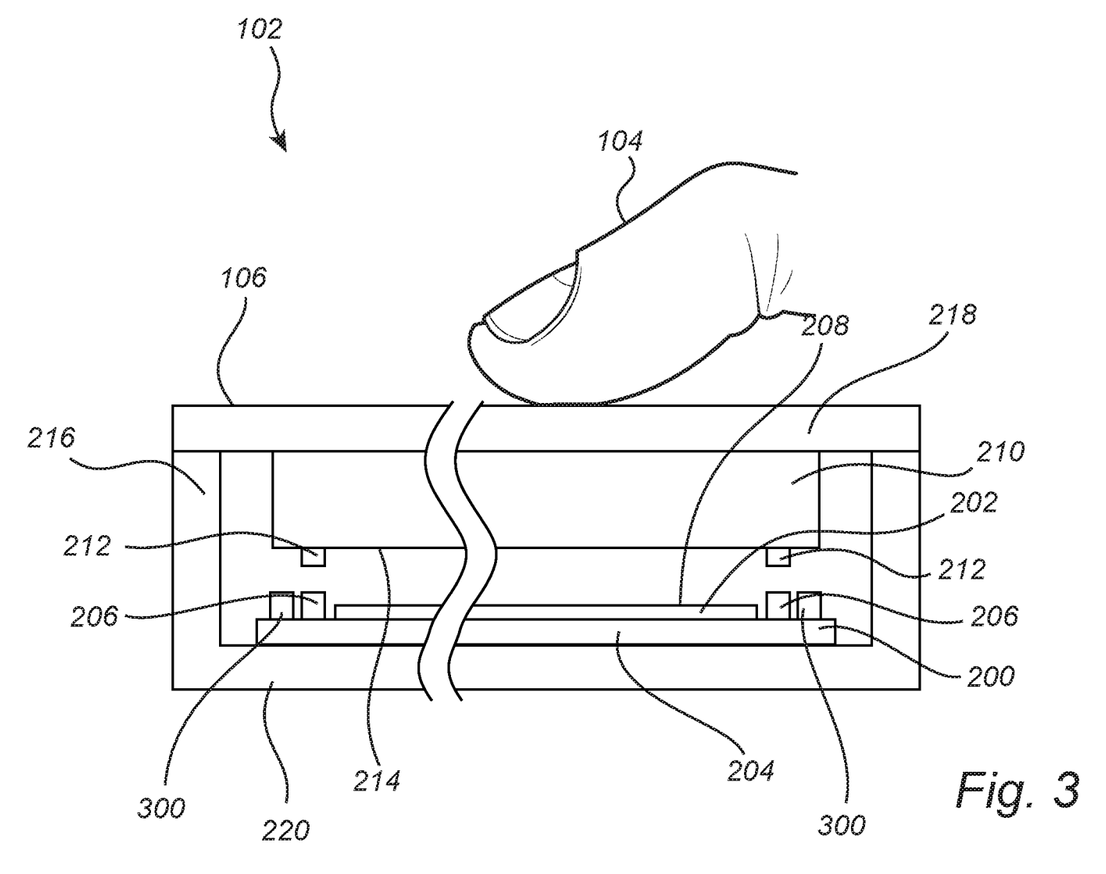
FIG. 3 schematically illustrates a biometric imaging device according to an embodiment of the invention.

FIG. 3 illustrates an example embodiment of the optical biometric imaging device 102 further comprising a spacer 300 arranged on the carrier 204 adjacent to the first electrically conductive structure 206. The spacer 300 may have height which is larger than the thickness of the image sensor 200 in order to act as mechanical protection for the image sensor 200, thereby preventing that the display panel 210 makes contact with the photodetector pixel array 202.

Figure 4:
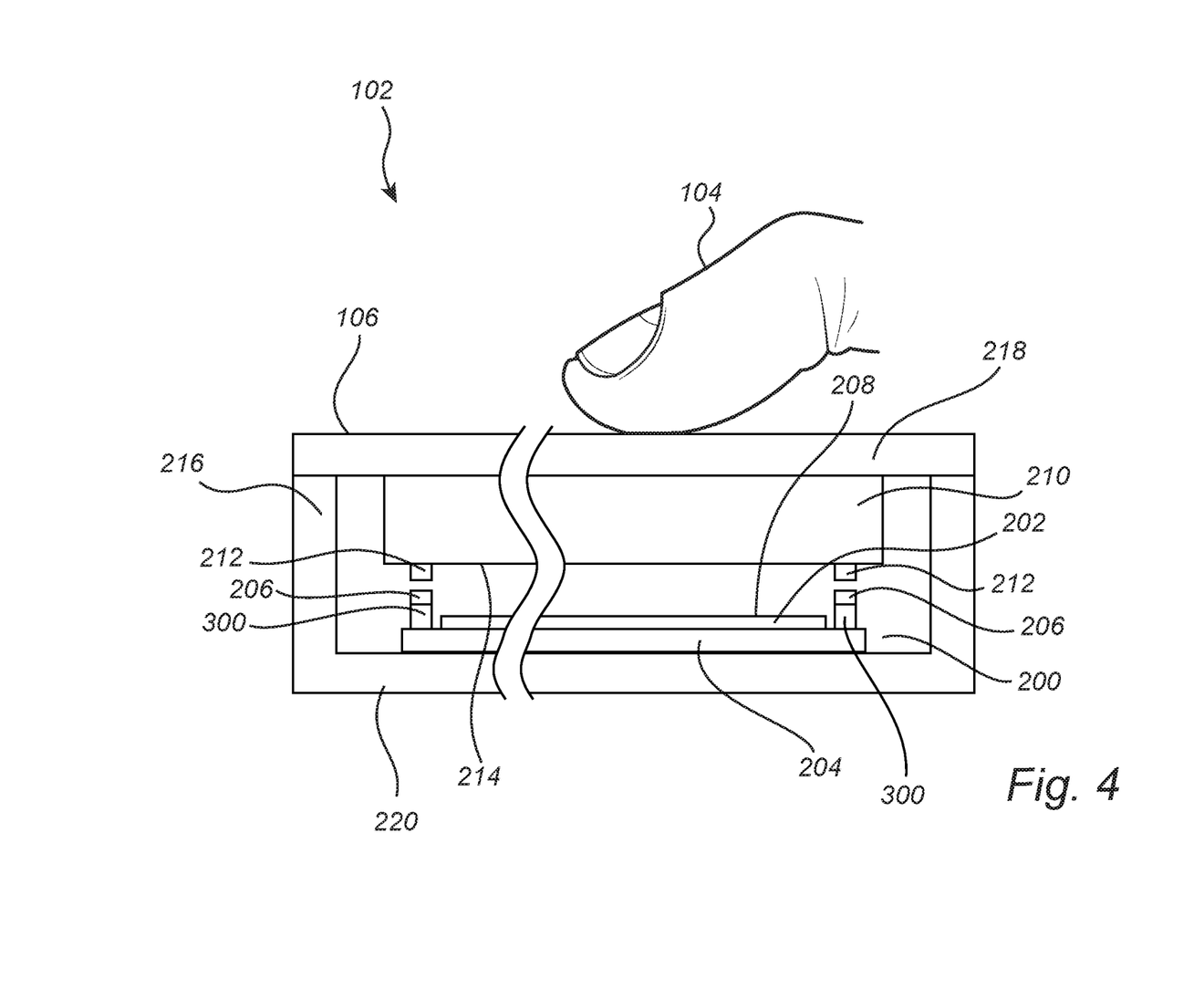
FIG. 4 schematically illustrates a biometric imaging device according to an embodiment of the invention.

FIG. 4 illustrates an example embodiment of the optical biometric imaging device where a spacer 300 is arranged between the carrier 204 and the first electrically conductive structure 206. In other words, the first electrically conductive structure 206 is arranged on top of the spacer 300.

Figure 5:
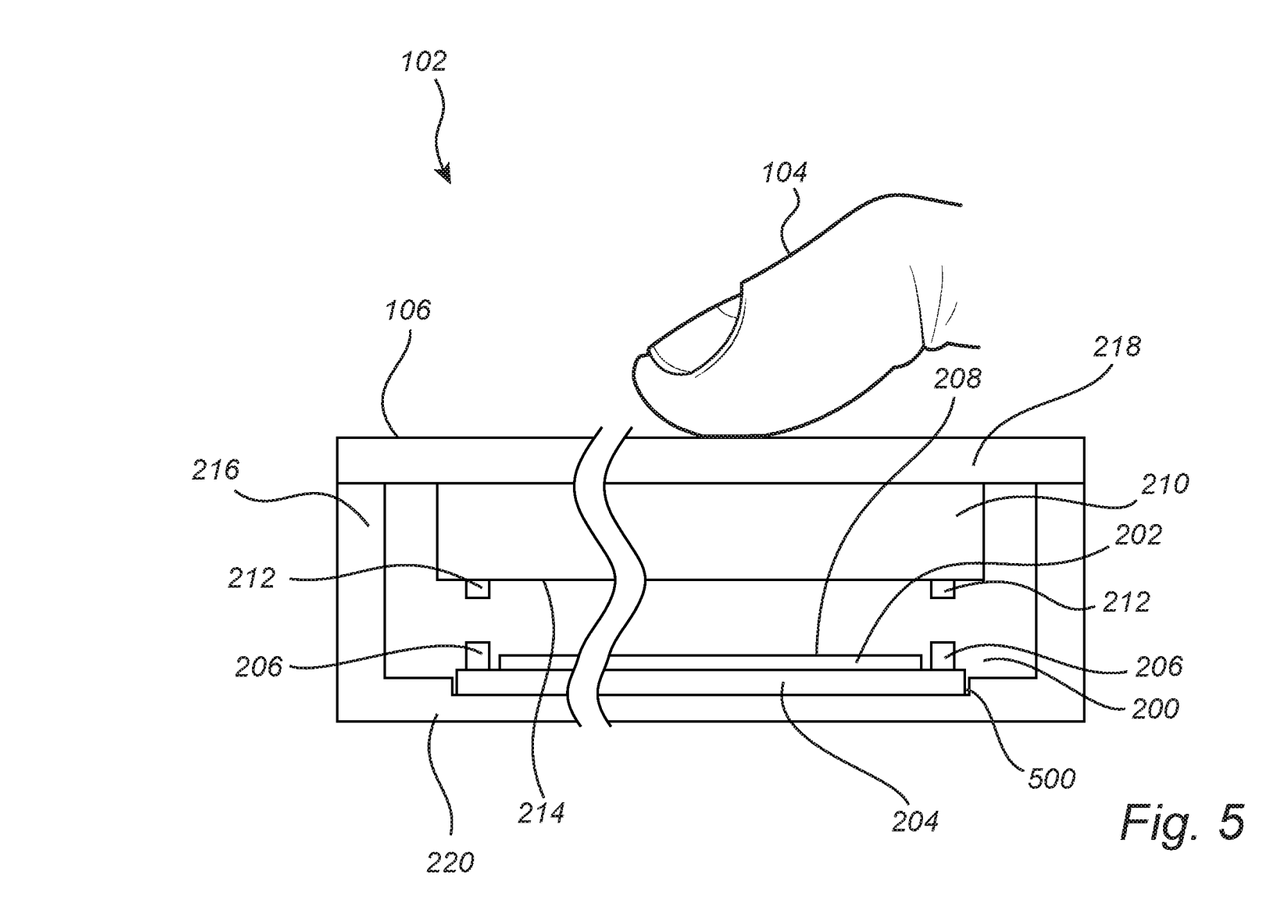
FIG. 5 schematically illustrates a biometric imaging device according to an embodiment of the invention.

FIG. 5 illustrates an example embodiment of the optical biometric imaging device 102 where the floor portion 220 of the frame 216 comprises a recess 500, and wherein the image sensor 200 is arranged in the recess 500 of the floor portion 220.

Figure 6:
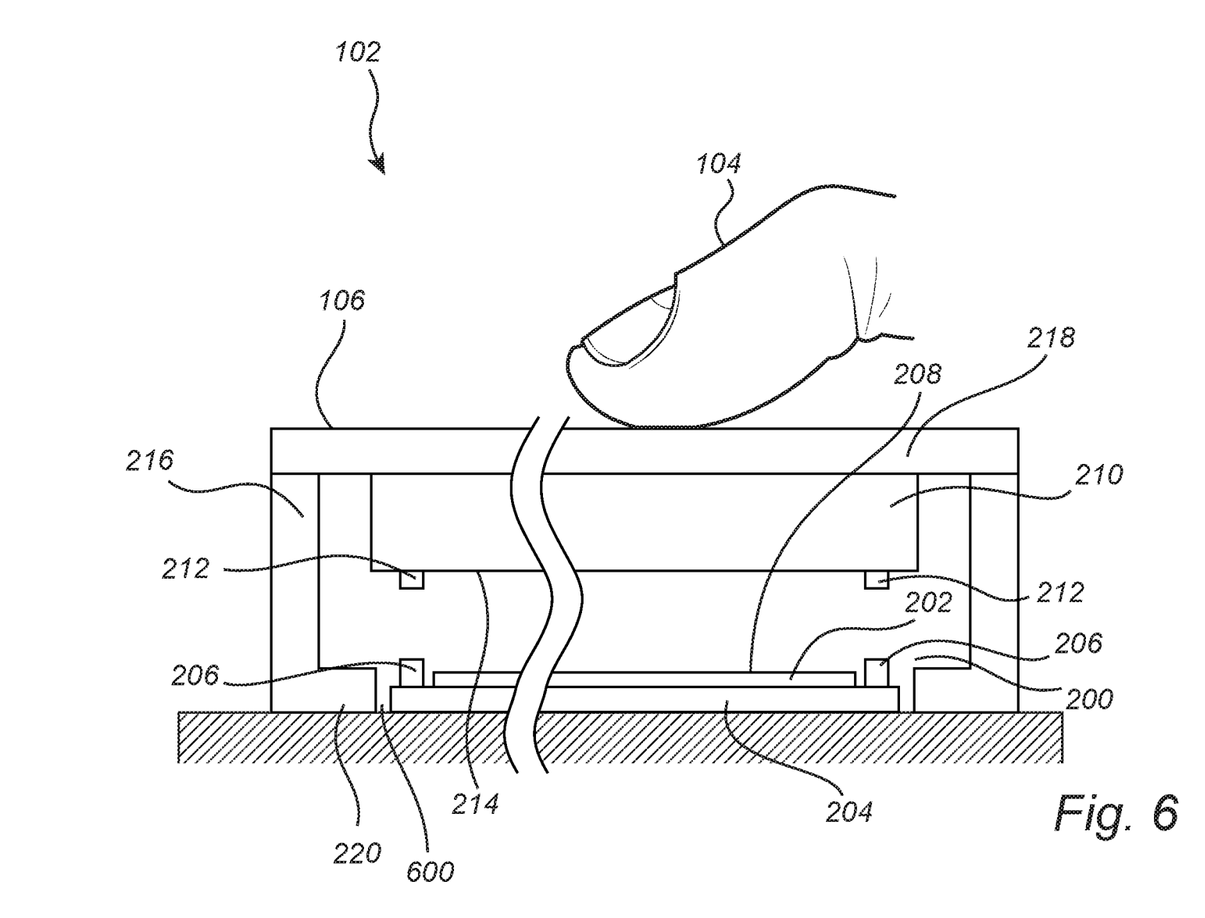
FIG. 6 schematically illustrates a biometric imaging device according to an embodiment of the invention.

FIG. 6 illustrates an example embodiment of the optical biometric imaging device 102 where the floor portion 220 comprises a through-opening 600, and wherein the image sensor 200 is arranged in the through-opening 600 of the floor portion 220. The frame 216 and the image sensor 200 may thus be arranged on another structural element, which for example may be a part of a deice in which the optical biometric imaging device 102 is arranged.

Figure 7:
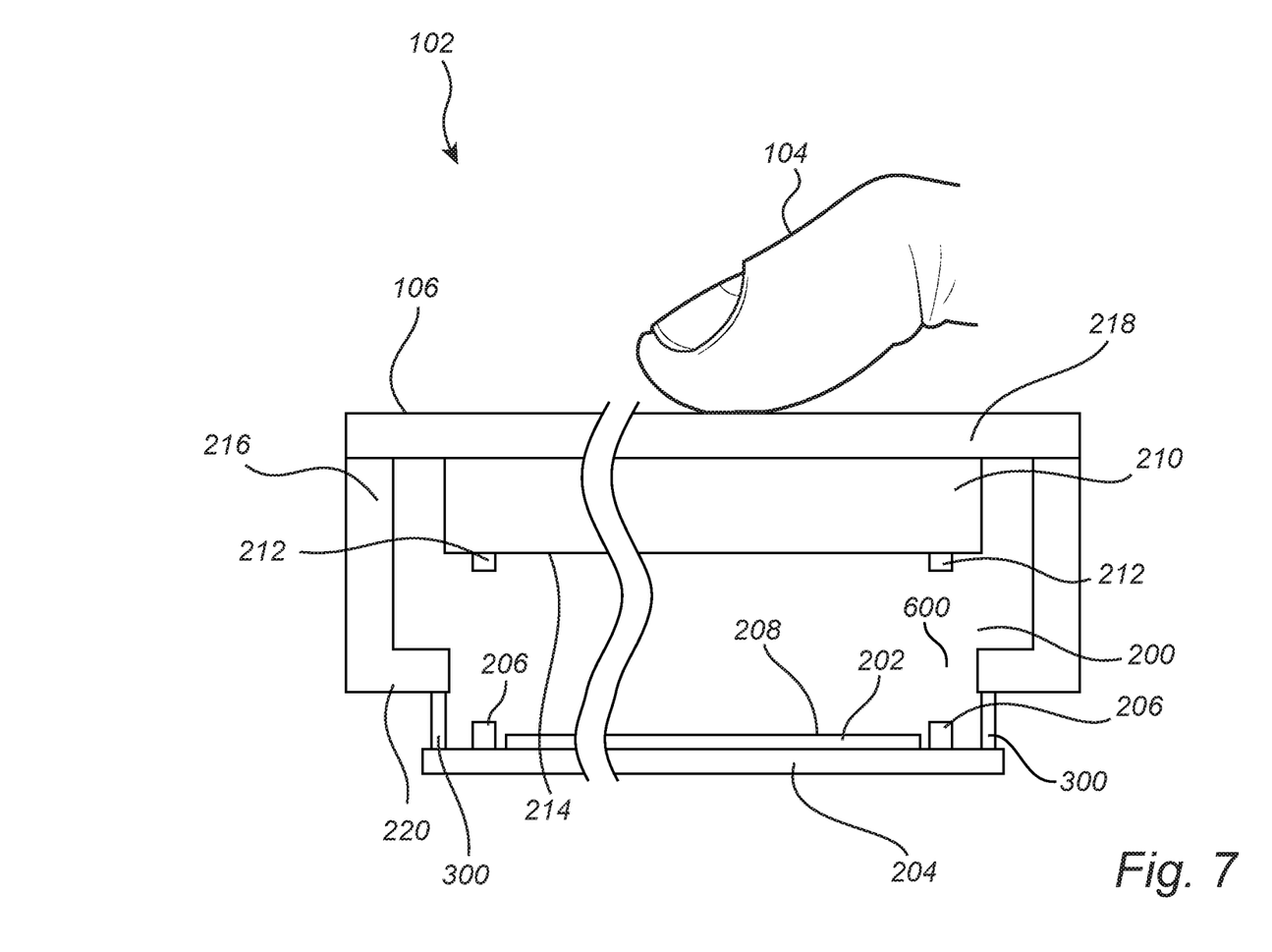
FIG. 7 schematically illustrates a biometric imaging device according to an embodiment of the invention.

FIG. 7 illustrates an example embodiment of the optical biometric imaging device 102 where the floor portion 220 comprises a through-opening 600, and wherein the image sensor 200 is arranged below the through-opening 600 of the floor portion 220. Here, spacers 300 may be used to attach the image sensor 200 to a bottom side of the frame 216. The spacers 300 may for example be attached to the frame 216 by means of an adhesive.

Figure 8:
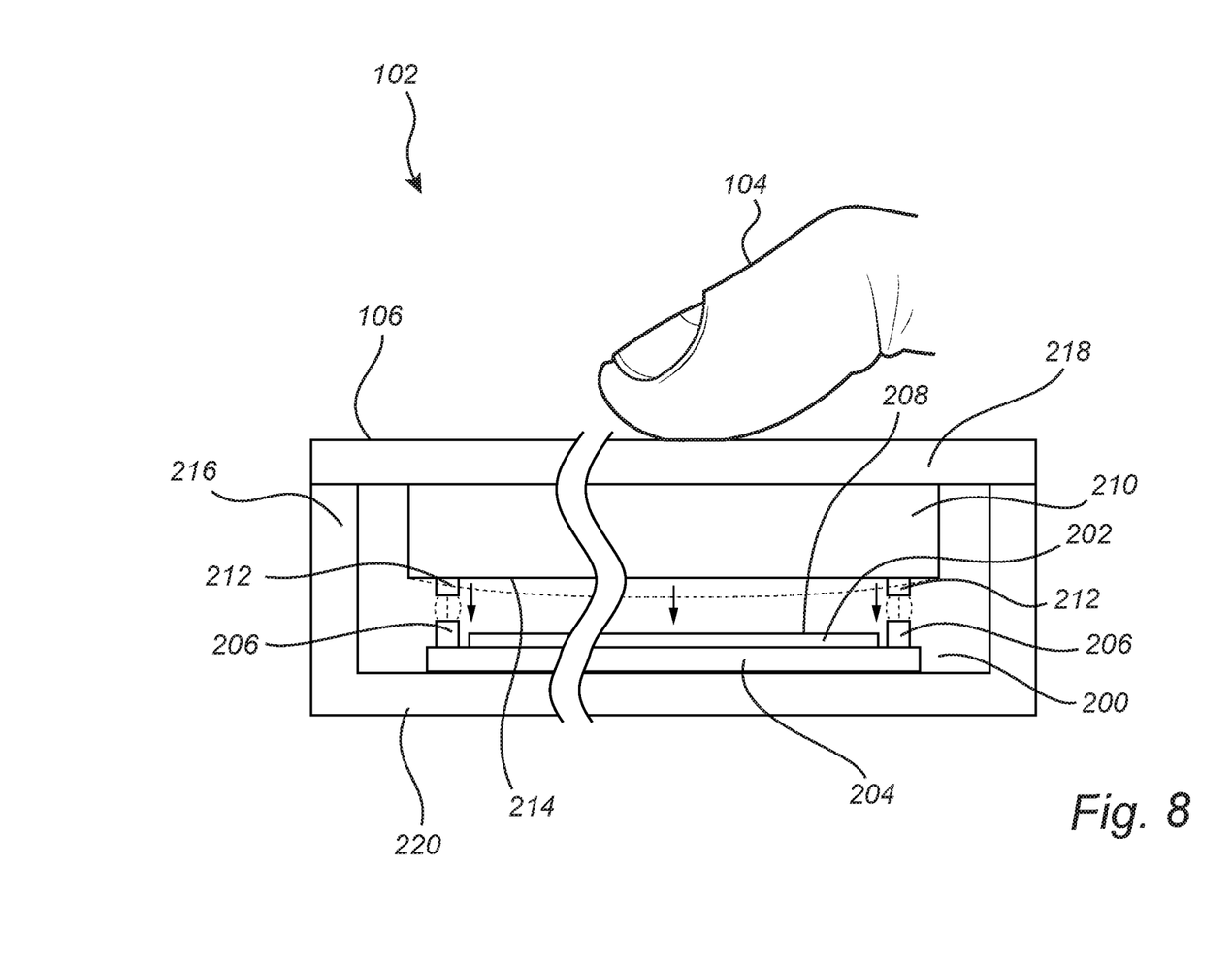
FIG. 8 schematically illustrates features of a method for operating a biometric imaging device according to an embodiment of the invention.

FIG. 8 schematically illustrates the optical biometric imaging device 102 when a finger 104 is pressing down on the outer surface 106 of the device, e.g. the cover glass 218 of the display panel 210. A display panel such as an AMOLED panel has a certain flexibility, and when a finger 104 is pressing on the panel with sufficient force, the flexible display panel 210 will deform and bend down in response to and proportional with the applied force.

The reduced distance between the first and second electrically conductive structure 206, 212 produces a corresponding increase in capacitance C, which is proportional to the applied force F. Since the demagnification factor (Demag) is proportional to the distance between the object and the image sensor, Demag is inversely proportional to the force F. the relations can be described as:

$$C \propto \frac{1}{d}; F \propto \frac{1}{d}; Demag \propto d$$

$$F \propto C; Demag \propto \frac{1}{F}$$

Figure 9:
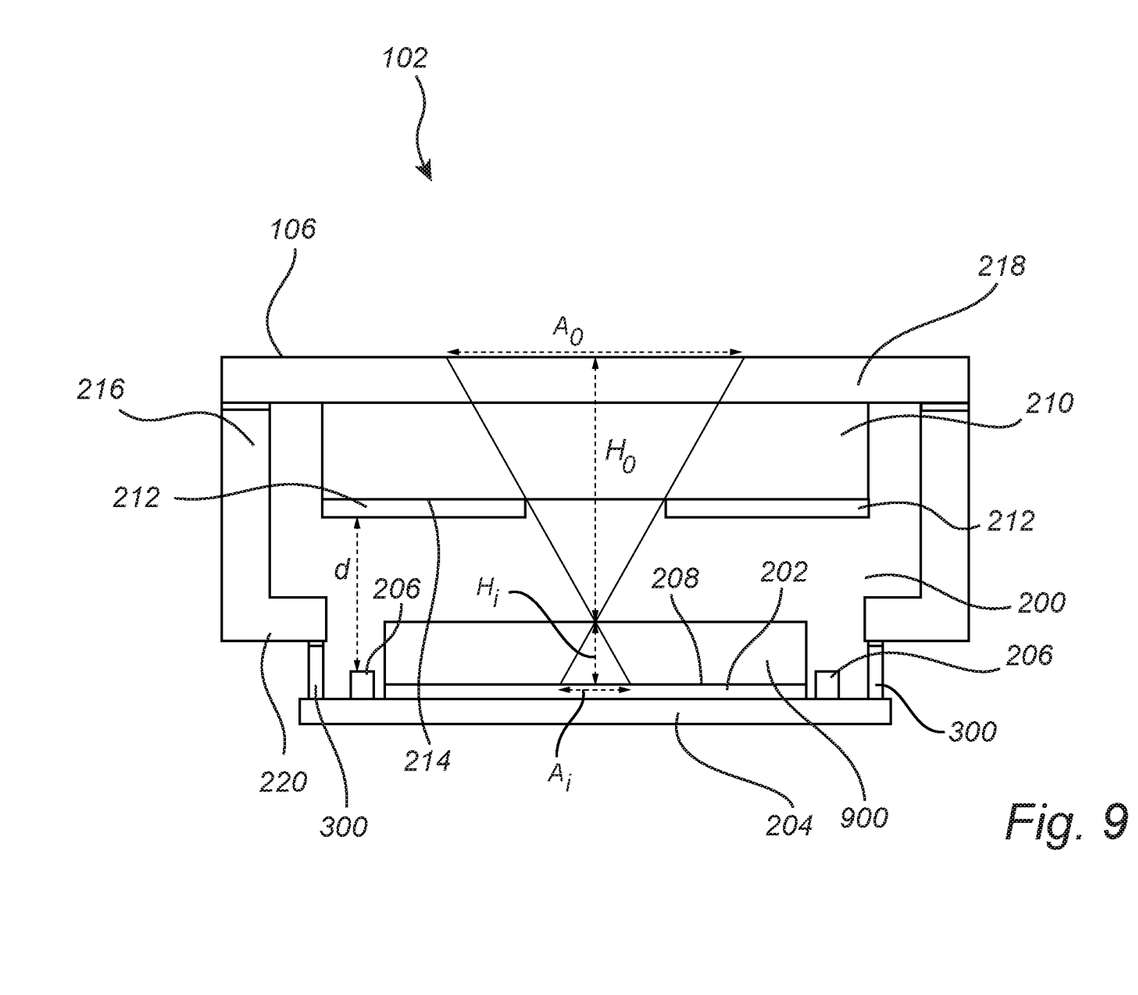
FIG. 9 schematically illustrates a biometric imaging device according to an embodiment of the invention.

FIG. 9 schematically illustrates a biometric imaging device according to an embodiment of the invention where the optical properties of the device are illustrated. With reference to FIG. 9, $H_o$ illustrates the object distance, $H_i$ is the image distance, $A_o$ is object area and $A_i$ is the image area.

The demagnification factor is calculated by the ratio of $H_o$ and $H_i$. K is fixed within the imaging device 102, while the distance $H_o$ is subject to change depending on a force applied to the top of the cover glass 218. It can further be assumed that d changes when $H_o$ changes, so the Demag depends on the changed $H_o$ which can be determined based on the change in d. Moreover, it can be assumed that the relation between a change in d and a change in H0 is known for a given device so that a change in $H_o$ can be derived based on a change of capacitance between the first electrically conductive structure 206 a second electrically conductive structure 212. FIG. 9 further illustrates that the second electrically conductive structure 212 is larger than the first electrically conductive structure 206.

Even though the invention has been described with reference to specific exemplifying embodiments thereof, many different alterations, modifications and the like will become apparent for those skilled in the art. Also, it should be noted that parts of the device may be omitted, interchanged or arranged in various ways, the device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An optical biometric imaging device configured to capture an image of an object in contact with an outer surface of the biometric imaging device, the biometric imaging device comprising:
   an image sensor comprising a carrier, a photodetector pixel array arranged upon the carrier, and image sensor circuitry configured to capture an image of the object in contact with the outer surface of the imaging device;
   the image sensor comprising a first electrically conductive structure integrated into the carrier and arranged adjacent to an active sensing area of the photodetector pixel array;
   a display panel arranged on top of and at a distance from the image sensor, the display panel comprising a second electrically conductive structure on a bottom side of the display panel and arranged to face the first electrically conductive structure of the image sensor; and
   capacitive readout circuitry arranged and configured to detect a capacitance between the first electrically conductive structure and the second electrically conductive structure.

2. The optical biometric imaging device according to claim 1, further comprising a frame, wherein a cover glass of the display panel is arranged to rest on the frame and the image sensor is arranged within the frame.

3. The optical biometric imaging device according to claim 1, further comprising a spacer arranged on the carrier adjacent to the first electrically conductive structure.

4. The optical biometric imaging device according to claim 1, further comprising a spacer arranged between the carrier and the first electrically conductive structure.

5. The optical biometric imaging device according to claim 1, comprising a plurality of said first electrically conductive structures.

6. The optical biometric imaging device according to claim 5, wherein the display panel comprises a plurality of said second electrically conductive structures.

7. The optical biometric imaging device according to claim 2, wherein the frame comprises a floor portion, thereby forming a U-shaped bracket cross section.

8. The optical biometric imaging device according to claim 7, and wherein the image sensor is arranged on the floor portion of the bracket.

9. The optical biometric imaging device according to claim 7, wherein the floor portion comprises a recess, wherein the image sensor is arranged in the recess of the floor portion.

10. The optical biometric imaging device according to claim 7, wherein the floor portion comprises a through-opening, wherein the image sensor is arranged in the through-opening of the floor portion.

11. The optical biometric imaging device according to claim 7, wherein the floor portion comprises a through-opening, wherein the image sensor is arranged below the through-opening of the floor portion.

12. A method for detecting a force on a surface of an optical biometric imaging device configured to capture an image of an object in contact with an outer surface of the biometric imaging device, the biometric imaging device comprising:
  an image sensor comprising a carrier, a photodetector pixel array arranged upon the carrier, and image sensor circuitry configured to capture an image of an object in contact with an outer surface of the imaging device;
  the image sensor comprising a first electrically conductive structure integrated into the carrier and arranged adjacent to an active sensing area of the photodetector pixel array;
  a display panel arranged on top of and at a distance from the image sensor;
  the display panel comprising a second electrically conductive structure on a bottom side of the display arranged to face the first electrically conductive structure of the image sensor; and
  capacitive readout circuitry arranged and configured to detect a capacitance between the first electrically conductive structure and the second electrically conductive structure;
  the method comprising detecting a change in capacitance between the first and second electrically conductive structures.

13. The method according to claim 12, further comprising determining a force on the outer surface of the imaging device based on a known relation between the capacitance and the distance between the first and second electrically conductive structures.

14. A method for detecting a force on a surface of an optical biometric imaging device configured to capture an image of an object in contact with an outer surface of the biometric imaging device, the biometric imaging device comprising:
  an image sensor comprising a photodetector pixel array and image sensor circuitry configured to capture an image of an object in contact with an outer surface of the imaging device;
  the image sensor comprising a first electrically conductive structure arranged on a top surface of the image sensor and adjacent to an active sensing area of the photodetector pixel array;
  a display panel arranged on top of and at a distance from the image sensor;
  the display panel comprising a second electrically conductive structure on a bottom side of the display arranged to face the first electrically conductive structure of the image sensor; and
  capacitive readout circuitry arranged and configured to detect a capacitance between the first electrically conductive structure and the second electrically conductive structure;
  the method comprising detecting a change in capacitance between the first and second electrically conductive structures, and
  determining a demagnification factor of the biometric imaging device based on a known relation between the capacitance and the distance between the first and second electrically conductive structures.

* * * * *